United States Patent [19]
Nakano et al.

[11] Patent Number: 5,156,699
[45] Date of Patent: Oct. 20, 1992

[54] PROCESS FOR PRODUCING A HYBRID FLEXIBLE HOSE

[75] Inventors: Yoshio Nakano; Hiroshi Akitake; Yoshitomi Mizumoto, all of Himeji; Akira Shiota, Takasago, all of Japan

[73] Assignee: Nishirin Rubber Industrial Co., Ltd., Kobe, Japan

[21] Appl. No.: 657,955

[22] Filed: Feb. 21, 1991

Related U.S. Application Data

[63] Continuation of Ser. No. 385,503, Jul. 27, 1989, abandoned.

[30] Foreign Application Priority Data

Oct. 23, 1987 [JP] Japan .................................. 62-268812

[51] Int. Cl.⁵ .......................... B32B 1/08; B32B 25/10
[52] U.S. Cl. ...................................... 156/149; 156/83; 156/156; 156/172; 138/137
[58] Field of Search ............... 156/149, 143, 172, 156, 156/83, 244.13, 244.14; 138/137, 126

[56] References Cited

U.S. PATENT DOCUMENTS

| | | | |
|---|---|---|---|
| 2,724,673 | 10/1955 | Hunter | 156/149 |
| 3,253,619 | 5/1966 | Cook et al. | 156/149 X |
| 3,463,197 | 8/1969 | Slade | 87/9 |
| 3,824,141 | 7/1974 | Miller et al. | 156/143 |
| 4,155,790 | 5/1979 | Galloway | 156/149 |
| 4,585,035 | 4/1986 | Piccoli | 138/126 X |
| 4,604,155 | 8/1986 | McKiernan | 156/149 X |
| 4,633,912 | 1/1987 | Pilkington et al. | |
| 4,880,036 | 10/1989 | Kitami et al. | 138/137 |
| 4,907,624 | 3/1990 | Jonasson | 156/149 X |

*Primary Examiner*—Jeff H. Aftergut
*Attorney, Agent, or Firm*—Armstrong & Kubovcik

[57] ABSTRACT

A process for producing a hybrid flexible having a synthetic resin core tube, a middle rubber layer, a braided fiber reinforcement layer and an outer rubber layer. The process includes a preparing step where the core tube is previously formed to a tube having an inside diameter less than a finished size, and the reinforcement is braided with a braiding angle less than rest angle, and a vulcanizing step where the hose is heated under a condtion that internal pressure is held in the synthetic core.

4 Claims, 3 Drawing Sheets

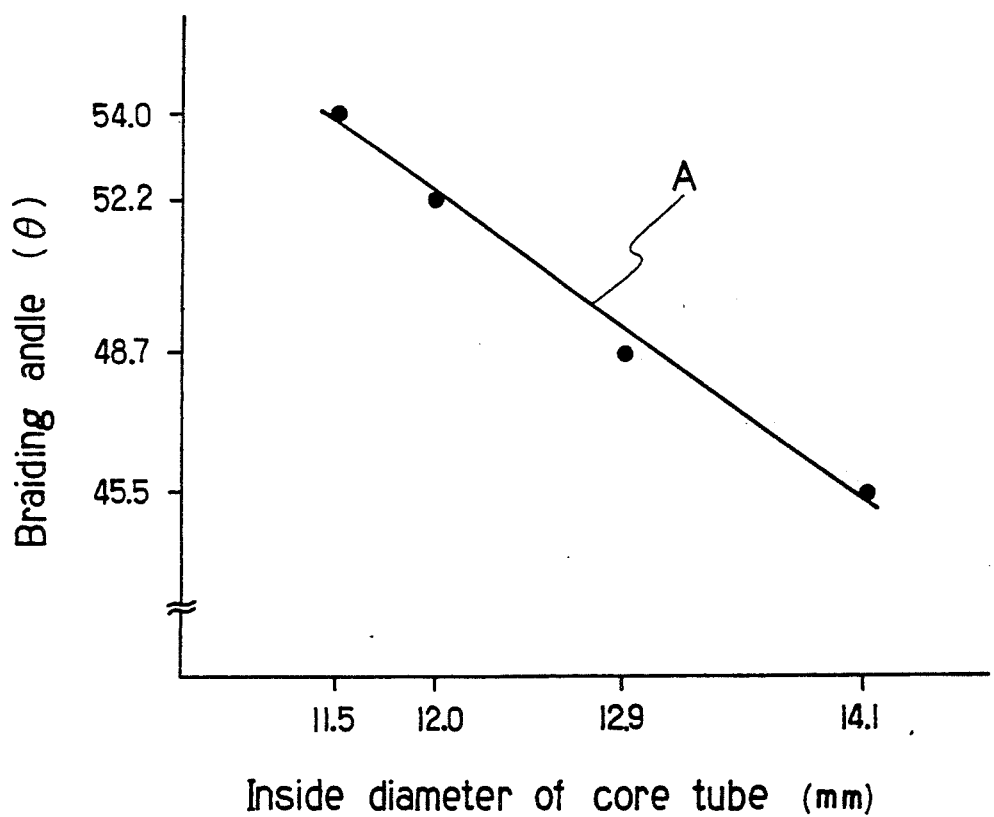

PROCESS FOR PRODUCING A HYBRID FLEXIBLE HOSE

This application is a continuation of application Ser. No. 385,503 filed Jul. 27, 1989, now abandoned.

BACKGROUND OF THE INVENTION

The present invention relates to a process for producing a hybrid flexible hose made of synthetic resin such as nylon and rubber, and more particularly, to a process for producing a long sized flexible hose without employing a solid mandrel of polyamides or the like.

Though the hose made through the process of the present invention can be applied in various field, the hose is especially useful for service of refrigerant, e.g. Freon, in an air conditioner of an automobile or for service of liquid fuel, e.g. gasoline or light oil.

As to a process for producing the hybrid hose made of synthetic resin and rubber, there has been hitherto known a process employing a mandrel mentioned hereinafter.

That is, the conventional process comprises a first step of preparing an unvulcanized hose by providing a solid mandrel as a core; forming an inner tube or core tube, for example, by extruding synthetic resin, e.g. polyamide resin, on the mandrel; applying unvulcanized rubber material to be a middle rubber layer on the core tube; braiding a reinforcement layer to cover the middle rubber layer; and applying an outer rubber layer thereon. Then secondly vulcanizing of the intermediate product is performed, and at last, the mandrel is extracted from the vulcanized hose.

In the above-mentioned conventional process, a metal mandrel, for example made of steel or stainless-steel, a resin mandrel, a rubber mandrel, and the like is employed as a solid mandrel. In addition, the layer of reinforcement strand is braided in neutral angle or rest angle (i.e. 54°44') at first in order to progress the pressure resistance of the hose.

However, the above-mentioned conventional process has the following drawbacks.

When a metal mandrel is employed as a solid mandrel, a molten resin is firstly extruded by means of a cross-head die and applied on the mandrel, or a previously prepared resin tube is mounted on the mandrel. Therefore, length of the hose is restricted by the factory space, since at least double length is required as an equipment space, and about 20 m is the maximum length for a producible hose. Further, when a short hose is produced, such conventional process causes disadvantages that production cost is high, and efficiency of work is low, since the mandrel is heavy.

When a resin mandrel or rubber mandrel is used, the mandrel is not easily extracted from a vulcanized hose, especially when the hose is long. In order to smoothly extract the mandrel, mold release agent or such lubricant is previously applied on the mandrel. However, if the agent is excessively applied, water in the agent evaporates and expands during vulcanization, and therefore, pin-holes or thin portions are partially caused in the resin core tube which is the innermost layer of the hose. Further, when the resin core tube has a wall thickness less than about 0.4 mm, the core tube tightly fits on the mandrel. Therefore, the inner tube is deformed or torn when the mandrel is extracted from a completed hose.

Since the conventional process employing a mandrel has the above-mentioned drawbacks, long-sized hoses (e.g. having a length not less than about 20 m) cannot be produced with low cost and quality of the products is not stable.

On the other hand, an internal air pressure might be employed instead of a solid mandrel as is employed in a field of low pressure hose production. However, as to high pressure hose having a reinforcement strand braided at rest angle, it is required to keep remarkably higher internal pressure than the steam pressure in an autoclave during vulcanization. That is, when the internal pressure is low, the inside surface of the core tube deforms to a square shape and becomes uneven. On the contrary, when the internal pressure is high, it is very difficult to seal the pressure in the core tube due to plastic flow of the core tube and rubber layers under the high temperature during vulcanization, and therefore, the inside diameter of the hose cannot be finished to a predetermined size due to leak of the internal pressure.

An object of the present invention is to provide a new producing process by which a long-sized hybrid hose can be obtained with low cost and an inside diameter can be correctly finished to a predetermined size.

SUMMARY OF THE INVENTION

According to the present invention, there is provided a process for producing a hybrid flexible hose without using a mandrel. The process comprises steps of preparing a core tube made of synthetic resin as an innermost layer, providing a middle rubber layer thereon, providing a braid reinforcement thereon and providing an outer rubber layer thereon, characterized in that, at first, the core tube is previously formed to a tube having an inside diameter less than a size to be finished, the braid reinforcement is braided with a braiding angle less than rest angle, and at vulcanizing step, the hose is heated under a condition that internal pressure is applied to the synthetic resin core tube.

In the present invention, the braiding angle is expanded with heat and internal pressure from the original angle less than the rest angle, until the angle accords to the rest angle, and the inside diameter is expanded from the unvulcanized state. Then the inner core tube is closely fitted to the inside surface of the middle rubber layer, and is formed to a correct circular shape, i.e. to a correct cylindrical shape.

The expansion of the braiding angle is caused by a fact that the resin core tube and the rubber layer are softened with heating, and further, forces to contract the hose in the longitudinal direction and to extend in a circumferential direction are caused in the hose due to the internal pressure applied to the hose. At the time, the last braiding angle where the opposing forces are mutually balanced is the rest angle. In the present invention, the above-mentioned braiding angle which once accords to the rest angle does not return to the original smaller angle since the hose is subjected under heating. If the internal pressure is merely applied under the normal temperature, the braiding angle returns to the original braiding angle from the rest angle after the internal pressure is released. However, in the present invention, since the hose is subjected to a permanent treatment, the braiding angle is stable after production.

Further, the reason of expansion of the inside diameter, (i.e. expansion of the wall in the circumferential direction) is that the middle rubber layer is expanded in accordance with the extension of the braiding angle, and the core tube is inflated by the internal pressure enclosed in the tube to fit the core tube against the inside surface of the middle rubber layer.

In the process of the present invention, it is not necessary to use a mandrel at all, since the thin core tube is closely fit against the inside surface of the middle rubber layer during the vulcanization step as mentioned above. Therefore, it is possible to produce a very long-sized hose, for example, of 20 to 500 m, if the capacity of the braiding machine is acceptable.

Further, it has been found that there is causal relation between a braiding angle before the vulcanization and an internal diameter of the core tube. That is to say, the less braiding angle with respect to the rest angle provides the larger internal diameter of the core tube. Therefore, by suitably selecting the braiding angle before vulcanization, any hose having a required inside diameter can be obtained from the same sized core tube.

Hereinafter, referring to the accompanying drawings, the process of the present invention will be explained in detail.

BRIEF DESCRIPTION OF THE DRAWINGS

FIG. 3 is a graph showing the relation between braiding angles before vulcanization and obtained inside diameters of the core tube.

DETAILED DESCRIPTION OF THE INVENTION

Figure 2:
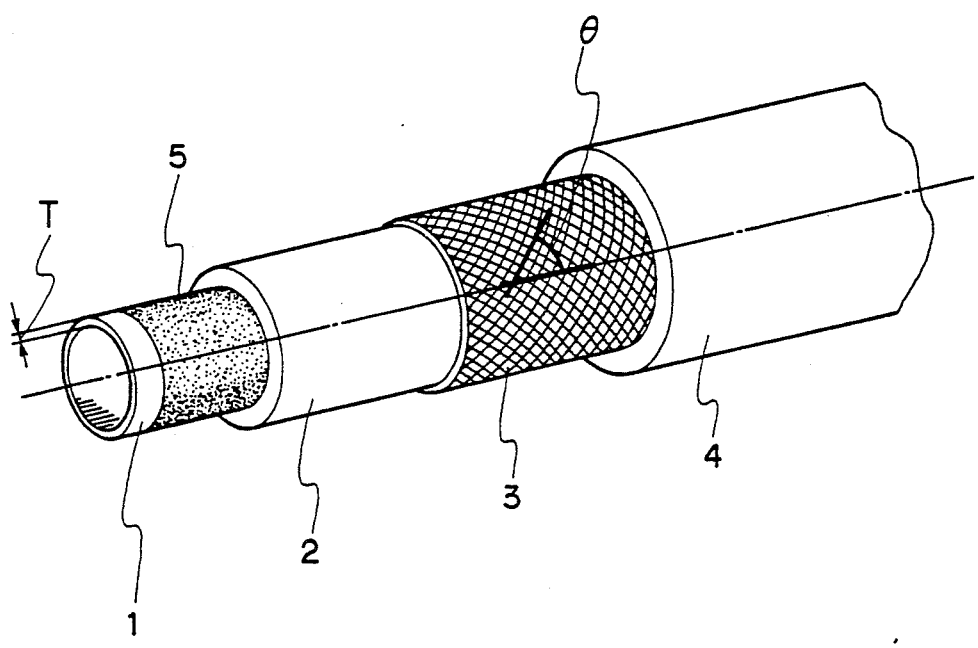
FIG. 2 is a partially cut away perspective view showing an embodiment of the hybrid flexible hose to be produced through the process of the present invention.

Firstly, referring to FIG. 2, a typical construction of a hose to be produced by the process of the present invention is shown. In FIG. 2, the numeral 1 denotes a core tube made of synthetic resin, the numeral 2 denotes a middle rubber layer, the numeral 4 denotes an outer rubber layer and the numeral 5 denotes an adhesive agent layer.

The core tube 1 is made of synthetic resin having gas impermeability for refrigerant and having refrigerant oil resistance, especially resistance against oil used with refrigerant, or a blend of such synthetic resin and a rubber. Typically, polyamide resins, for example, nylon 6, nylon 66, nylon 11, nylon 12, and modified nylon such as nylon 66/ethylene-propylene-diene copolymer are used.

Wall thickness T of the core tube 1 is 0.1 to 0.4 mm, preferably 0.15 to 0.2 mm. If the wall thickness is less than 0.1 mm, the core tube cannot be easily produced and the gas impermeability becomes low. On the other hand, if the wall thickness is larger than 0.4 mm, the core tube cannot be easily expanded when inside pressure is applied and the core tube cannot be securely fixed to the middle rubber layer. Therefore, the extent which is not included in the above-mentioned area is not preferable.

Material of the above-mentioned middle rubber layer 2 is selected, according to the fluid to be used, from materials having good oil resistance, good impermeability for gas or the like, good moisture proof (impermeability) or heat resistance, for example nitrile butadiene rubber (hereinafter, referred to as NBR), chlorosulfonated polyethylene (hereinafter, referred to as CSM), chlorinated polyethylene (hereinafter, referred to as CPE), isobutylene-isoprene rubber (hereinafter, referred to as IIR), chlorinated isobutylene-isoprene rubber (hereinafter, referred to as Cl-IIR), ethylene-propylene-diene rubber (hereinafter, referred to as EPDM), ethylene-propylene copolymer (hereinafter, referred to as EPM), their halides, and blends of the above rubbers.

It should be noted that IIR or Cl-IIR has superior moisture impermeability compared with EPDM or NBR. For instance, moisture permeability of IIR or Cl-IIR is approximately 1/40 of that of EPDM and approximately 1/200 of that of NBR. Further, Cl-IIR is preferably used because of its better workability than IIR. In addition, a typical refrigerant oil for Flon R134a, which becomes widely used rather than Flon R12, is polyalkylene glycol (PAG) oil which is hydrophilic, and Cl-IIR is preferably used as a middle rubber layer material having sufficient moisture impermeability in suchlike situation.

With respect to wall thickness of the middle rubber layer 2, the extent of thickness 0.7 to 3 mm, especially 1 to 2 mm is preferably employed on viewpoints of flexibility, anti-kinking, impermeability, hose weight, and sealing at the coupling portion.

The fiber reinforcement layer 3 is constructed by braiding strands of natural fibers or synthetic fibers, e.g. vinylon fiber, polyamide fiber, polyester fiber, and polyaramide fiber, around the outside surface of the middle rubber layer 2. In general case, such reinforcement strands or threads are subjected to RFL (Resorcinol Formalin Latex) treatment, and thereafter, the strands are braided.

As materials of the outer rubber layer 4, various rubbers having good weatherability and good heat resistance, e.g. EPDM, IIR, CPE, Cl-IIR, EPM or their halides, are utilized. The wall thickness of the outer rubber layer 4, though which is to be determined according to the wall thickness of the middle rubber layer, is generally 0.3 through 3 mm.

The adhesive agent layer 5 is applied on the outside surface of the core tube. For example, chlorinated rubber type (e.g. Chemloc 238 available from Rord Fareast), phenolic type (e.g. Metaloc NC available from Toyo Kagaku Kenkyusho), nitril phenolic type (e.g. Metaloc CN available from Toyo Kagaku Kenkyusho) or the like can be preferably used as the adhesive agent. There are cases where the adhesive agent layer is required and other cases where the layer is not required.

The above-mentioned hybrid hose has good impermeability for preventing permeance of refrigerant gas such as Freon and good oil-resistance for preventing damage due to lubricant or liquid fuel, since the core tube 1 made of synthetic resin is employed. Further, the hose has good flexibility since rubbers are used as middle layer and the outer layer, and has a good moisture impermeability for preventing entrance of water vapour from outside. Therefore, the hose is suitably employed as a hose for air conditioners or fuel service hose in an automobile.

Figure 1:
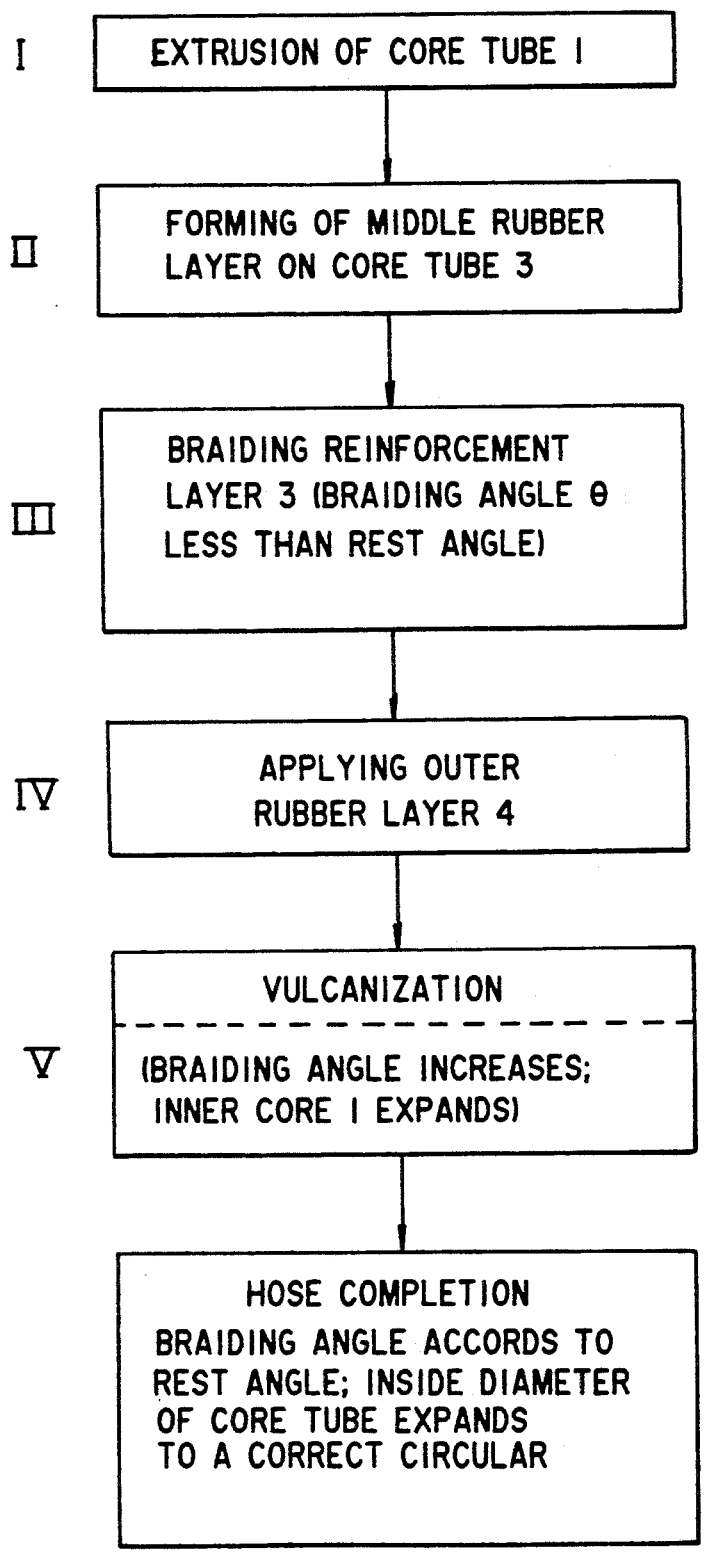
FIG. 1 is a block diagram showing an embodiment of the process of the present invention.

Hereinafter, an embodiment of producing process of the present invention for obtaining the above-mentioned hybrid hose is explained on the basis of FIG. 1.

Step I: Firstly, a resin core tube 1 is formed by extrusion without using mandrel, and if necessary, adhesive agent 5 is applied thereon by dipping or brush application.

Step II: Next, rubber is extruded and applied on the outside surface of the core tube 1 to form a middle rubber layer 2. During extrusion of the rubber, if internal pressure is applied in the core tube to keep correct circularity, the coating can be easily performed. However, in general case, the application is possible without applying internal pressure. Of course, no mandrel is employed in this step.

Step III: Next, fiber reinforcement layer 3 is braided on the outside surface of the middle rubber layer 2.

The step III to be carried out before vulcanization is the most important step in the present invention. It is necessary to determine the braiding angle $\theta$, i.e. crossing angle of the reinforcing strand with respect to the center line of the hose, to an angle less than the rest angle or neutral angle (54°44'). The value of the braiding angle $\theta$ has a causal relation with the finished size of the inside diameter of the core tube 1 (as mentioned after in detail with referring to Examples). That is, the smaller the braiding angle $\theta$ (i.e. the larger the difference from the rest angle) is set, the larger the finished size becomes. Therefore, a suitable braiding angle must be selected according to the required finished size of the core tube 1.

Step: IV: Rubber for an outer rubber layer 4 is extruded and applied on the outside surface of the fiber reinforcement layer 3.

Then, an intermediate product (hereinafter, referred to as unvulcanized product) of hybrid hose is obtained, and it is subjected to the next vulcanizing step.

Step: V: The unvulcanized product of hose is inserted in a vulcanizing autoclave and is vulcanized under pressurized steam with 150° C. in temperature and about 4 kgf/cm² in pressure.

Before the insertion of the hose, each end of the unvulcanized product of hose is sealed with a heat-resistant band or plugged with an air supplying valve having a check valve, and the hose is filled with compressed air of 2 through 10 kgf/cm² to have internal pressure.

Since heat is applied on the hose during the vulcanization step, the braiding angle $\theta$ of the reinforcement layer is gradually enlarged, and when the braiding angle accords to the rest angle, the enlargement stops. At the same time, the resin core tube 1 is radially expanded and is closely abutted against the inside surface of the middle rubber layer 2. As a result, the effects that the inside diameter increases and the wall-thickness decreases are caused.

Vulcanizing time can be changed in accordance with materials of rubber, various added agent, size and configuration, and is generally 10 to 80 minutes.

After the above-mentioned producing process, the core tube 1 is finished to a tube having a correct circular cross section and a smooth inside surface without defect, e.g. deformation, separation and unevenness.

In the process of the present invention, when the internal pressure applied to the unvulcanized hose, the braiding angle and the inside diameter of the core tube before vulcanization are suitably selected, the inside diameter of the completed hose can be enlarged to a double size, in the maximum case.

In Table 1, each braiding angle $\theta$ before vulcanization, inside diameter of the core tube 1 before vulcanization and their finished sizes of four Examples are shown. In those Examples, material of the core tube 1 was polyamide resin, the wall thickness was 0.3 mm, the internal pressure was 6 kgf/cm² at the start of vulcanization, the material of middle rubber layer 2 was NBR, the wall thickness thereof was 1.5 mm, the material of the fiber reinforcement 3 was polyester fibers, the material of the outer rubber layer 4 was EPDM, and the wall thickness thereof was 1.2 mm. During the vulcanization, the internal pressure rised to 10 kgf/cm² at the maximum since air in the tube expanded and water in the tube became expended steam.

TABLE 1

| | Before vulcanization | After vulcanization |
|---|---|---|
| Braiding angle $\theta$ (°) | Inside diameter of core tube 1 (mm) | Finished size of inside diameter of core tube (mm) |
| 54.00 (54° 0') | 11.5 | 11.5 |
| 52.2 (52° 12') | " | 12.0 |
| 48.7 (48° 42') | " | 13.0 |
| 45.5 (45° 30') | " | 14.0 |

As is clearly understood, the smaller braiding angle $\theta$ causes the larger finished inside diameter of the core tube 1. In addition, the relation is about linear relation, i.e. direct proportion, as shown by a line A in FIG. 3.

Therefore, in the producing process of the present invention, the inside diameter of the core tube, i.e. inside diameter of the hose, can be made in any required size by controlling the braiding angle of the reinforcement layer before vulcanization.

Materials of hoses shown in Table 2 were prepared, and three types of hoses (Examples 1 to 3) were produced through the process of the present invention as shown in Table 3. Only braiding angle of the reinforcement layer were changed each other, and another conditions were the same. Another unvulcanized product of hose having the same construction as Example 1 was prepared, and was vulcanized without applying internal pressure to obtain a hose of Reference Example 1.

The completed hoses of Examples 1 to 3 and Reference Example 1 were investigated with respect to existance of deformation and circularlity. The results are shown in Table 3.

In addition, similar hoses to Examples 1 to 3 were produced in the same manner excepting that Cl-IIR was employed rather than NBR as the middle rubber layer material. The properties of Cl-IIR used are shown in Table 4. The obtained hoses provided substantially the same investigation results as Examples 1 to 3 indicated in Table 3.

TABLE 2

| Core tube | Material | nylon 11 |
|---|---|---|
| | Wall thickness (mm) | 0.3 |
| Middle rubber layer | Material | NBR |
| | Hardness (Hs) | 80 |
| | Wall thickness (mm) | 1.5 |
| Reinforcement layer | Material | PET |
| Outer rubber layer | Material | EPDM |
| | Hardness* | 70 |
| | Wall thickness (mm) | 1.2 |

*JIS K 6301: Hs (JIS A)

TABLE 3

| | Before Vulcanization | | | | After Vulcanization | | | |
|---|---|---|---|---|---|---|---|---|
| | Inside diameter of core tube (mm) | Wall thickness of hose (mm) | Pressure of injected air (kgf/cm²) | Braiding angle | Inside diameter of core tube (mm) | Wall thickness of hose (mm) | Circularity | Braiding angle |
| Example | | | | | | | | |
| 1 | 11.5 | 4 | 6 | 54° | 11.5 | 4.0 | good | 54° .44' |
| 2 | " | " | " | 52° | 12.0 | 3.5 | " | " |
| 3 | " | " | " | 50° | 12.5 | 3.0 | " | " |
| Reference Example | " | " | 0 | 54° | Unmeasurable since deformation was too large | | | |

TABLE 4

| Test Item | Test Data | Test Method |
|---|---|---|
| Normal Condition | | |
| Hardness (Hs) | 75 | JIS K 6301 |
| Tensile Strength (kg/cm²) | 156 | |
| Elongation (%) | 290 | |
| Tear Strength (kg/cm) | 41 | |
| Oil Resistance (PAG, 100° C. × 70 sec) | | |
| Change in Hardness | −1 | |
| Ratio of Change in Tensile Strength (%) | +8.8 | |
| Ratio of Change in Elongation (%) | −16.1 | |
| Ratio of Change in Volume (%) | +0.5 | |
| Moisture Permeability (60° C. × 95%, g/m/168 h) | 0.02 | |
| R 134 Permeability (90° C., g/m72 h) | 2.05 | SAE J 51 |

As shown in Table 3, the hoses of Examples 1 to 3 produced through the process of the present invention were good in circularity, and any deformation was not caused at all. On the contrary, as to Reference Example 1 where no internal pressure was applied in the core tube could not be completed to a hose, since deformation was remarkable. From those facts, it appears that application of the internal pressure to the core tube and raise of the internal pressure by heating during vulcanization is essential feature.

The optimum value of the internal pressure varies according to the material of hoses, wall thickness, steam pressure and temperature during vulcanization. Therefore, the optimum value must be selected through experiments.

It is desirable to dry the pressurized air enclosed in the core tube, since the internal pressure is influenced by the water in the tube.

The process for producing a hybrid hose of the present invention has the following advantages.

1 Since any mandrel is not required, a long-sized hose, e.g. about 500 m, can be produced and the production cost is low.

2 Any inside diameter of hose can be obtained from the same-sized core tube by merely controlling the braiding angle before vulcanization, and therefore, the hose can be easily produced and there is little error in size.

3 Since the core tube radially expands during vulcanization, a hose having a thin core tube can be easily obtained. Further, since the wall thickness can be thick before vulcanization, the core tube itself can be easily handled, and manufacture of the hose without mandrel is not difficult.

Though several embodiments are explained above, it is to be understood that the present invention is not limited to the above-mentioned embodiments, and various changes and modifications may be made in the invention without departing the spirit and the scope thereof.

What we claim is:

1. A mandrel free process for producing hybrid flexible hose having a core tube of synthetic resin, a rubber layer over said core tube, a braided fabric reinforcement over said rubber layer and an outer rubber layer over said fabric reinforcement, the steps comprising:

preparing a hollow cylindrical core tube of synthetic resin having an inner diameter less than the inner diameter of the flexible hose to be produced and having open ends;

applying a rubber layer over the exterior surface of said core tube of synthetic resin;

braiding a fabric reinforcement onto the exterior surface of said rubber layer with a braiding angle less than the braiding rest angle to be formed in the flexible hose at the inner diameter to be produced;

applying an outer rubber layer over said fabric reinforcement;

sealing the opposite ends of said hollow cylindrical core with said rubber layer, fabric reinforcement and outer rubber layer thereon, and applying an internal pressure to said sealed core; and, with said internal pressure applied, applying heat to said sealed core and expanding said sealed core and said rubber layer over the exterior surface of said synthetic resin core tube and increasing said braiding angle of said braided reinforcement with said internal pressure and said applied heat to said rest angle and fitting said exterior surface of said synthetic resin core tube to the interior surface of said rubber layer and, with said pressure and heat applied, vulcanizing said hose and fixing said braiding angle at said rest angle.

2. The process of claim 1 wherein, said core tube having an inner diameter less than the inner diameter of the flexible hose to be produced has a wall thickness of from 0.1 to 0.4 mm.

3. The process of claim 1 wherein, during the steps where said rubber layer over the exterior surface of said core tube, said fabric reinforcement layer and said outer rubber layer are applied on said core tube, a low internal pressure is held in the core tube.

4. The process of claim 3 wherein, an end of the core tube is plugged airtightly and another end is plugged with an air supplying valve having a check valve, after the core tube is prepared.

* * * * *